(12) United States Patent
Kuo et al.

(10) Patent No.: US 10,553,340 B2
(45) Date of Patent: Feb. 4, 2020

(54) COIL COMPONENT

(71) Applicant: CYNTEC CO., LTD., Hsinchu (TW)

(72) Inventors: Min-Lian Kuo, Hsinchu (TW);
Dao-Chuang Zhang, Suzhou (CN);
QiQi Yang, Nanchung (CN); I-Feng Lin, Hsinchu (TW); Chi-Hsiang Chuang, Hsinchu (TW); Chao-Hung Hsu, Hsinchu (TW)

(73) Assignee: CYNTEC CO., LTD, Hsinchu (TW)

( * ) Notice: Subject to any disclaimer, the term of this patent is extended or adjusted under 35 U.S.C. 154(b) by 221 days.

(21) Appl. No.: 15/825,460

(22) Filed: Nov. 29, 2017

(65) Prior Publication Data

US 2018/0211756 A1  Jul. 26, 2018

(30) Foreign Application Priority Data

Jan. 20, 2017  (CN) .......................... 2017 1 0044978

(51) Int. Cl.
| | |
|---|---|
| *H01F 27/29* | (2006.01) |
| *H01F 17/04* | (2006.01) |
| *H01F 17/00* | (2006.01) |
| *H01G 4/005* | (2006.01) |
| *H01F 27/02* | (2006.01) |
| *H01F 27/32* | (2006.01) |
| *H01F 41/066* | (2016.01) |
| *H01F 41/12* | (2006.01) |
| *H01F 27/28* | (2006.01) |

(52) U.S. Cl.
CPC ....... *H01F 17/045* (2013.01); *H01F 17/0013* (2013.01); *H01F 27/02* (2013.01); *H01F 27/2823* (2013.01); *H01F 27/29* (2013.01); *H01F 27/327* (2013.01); *H01F 41/066* (2016.01); *H01F 41/127* (2013.01); *H01G 4/005* (2013.01); *H01F 2017/0093* (2013.01)

(58) Field of Classification Search
CPC ................................. H01F 27/00–36
USPC .... 336/65, 83, 107, 192, 196, 198, 200, 232
See application file for complete search history.

(56) References Cited

U.S. PATENT DOCUMENTS

| | | | |
|---|---|---|---|
| 2008/0003864 A1 | 1/2008 | Hatakeyama et al. | |
| 2012/0019343 A1 | 1/2012 | Hsieh et al. | |
| 2014/0002227 A1* | 1/2014 | Hsieh ...................... | H01F 7/022 336/200 |

(Continued)

FOREIGN PATENT DOCUMENTS

TW        I1474349 B      2/2015

*Primary Examiner* — Tuyen T Nguyen
(74) *Attorney, Agent, or Firm* — Kirton McConkie; Evan R. Witt

(57) ABSTRACT

A coil component includes a core member, a coil structure, at least one terminal electrode and a soldering member. The coil structure includes an insulating layer. A first portion of the coil structure is wound around the core member. The terminal electrode is mounted onto the core member. The terminal electrode includes a clamping portion and a supporting portion. The clamping portion includes a bent part for clamping a second portion of the coil structure. The supporting portion includes a protruding part. A conductive wire of a third portion of the coil structure is revealed. A soldering member covers the protruding part to connect the supporting portion to the conductive wire to form electrical connection between the coil structure and the terminal electrode.

20 Claims, 9 Drawing Sheets

(56) References Cited

U.S. PATENT DOCUMENTS

2015/0042436 A1\* 2/2015 Arimitsu ................. H01F 27/29
                                                            336/192
2016/0217919 A1\* 7/2016 Iwata ...................... H01F 27/29
2016/0365191 A1\* 12/2016 Horie ..................... H01F 27/24
2017/0316874 A1\* 11/2017 Igarashi ................. H01F 27/24

\* cited by examiner

COIL COMPONENT

FIELD OF THE INVENTION

The present disclosure relates to a coil component and a manufacturing method thereof, and particularly to a minitype integrated coil component and a manufacturing method thereof.

BACKGROUND OF THE INVENTION

For manufacturing a minitype coil component, laser soldering is a common procedure. According to this technology, the wires and the lead frames slightly melt and are joined together, and electrical conduction between the wires and the lead frames is satisfied. There is no contact at the workpieces, and no physical load is placed on the workpieces while performing the contact-free laser soldering. Hence, damage due to impact on the workpieces is basically avoided. The peak energy of the laser used in current laser soldering procedure is usually greater than 4000 W to melt the lead frames to be joined with the wires. Such laser soldering procedure can be finished within several milliseconds.

However, high energy of the laser very likely damages the elements of the coil component. To reduce such influence, more effort is put to expensive machine or complicated process, which results in increasing product cost and production time.

Therefore, a new approach to the coil component which can solve the above drawback is desired.

SUMMARY OF THE INVENTION

The present disclosure provides a coil component. The coil component includes a core member, a coil structure, at least one terminal electrode and a soldering member. The coil structure includes an insulating layer, and a first portion of the coil structure is wound around the core member. The terminal electrode is mounted onto the core member and includes a clamping portion and a supporting portion. The clamping portion includes a bent part for clamping a second portion of the coil structure. The supporting portion includes a protruding part. A conductive wire of a third portion of the coil structure is revealed. The soldering member covers the protruding part to connect the supporting portion to the conductive wire to form electrical connection between the coil structure and the terminal electrode.

In an embodiment, the protruding part has a propping surface in contact with the third portion of the coil structure, and the propping surface confines the third portion of the coil structure in a space.

In an embodiment, the core member is made of a magnetically permeable material. The core member includes a winding core portion and at least one flange portion. The terminal electrode is mounted onto the flange portion.

In an embodiment, the terminal electrode includes a main body mounted onto a mounting surface of the flange portion. The supporting portion is connected to the main body. An intersection space is formed between the mounting surface and the propping surface for supporting the third portion of the coil structure.

In an embodiment, the winding core portion extends along an axial direction, and the flange portion has an outer surface perpendicular to the axial direction and a lateral surface orthogonal to the outer surface. The mounting surface is the outer surface.

In an embodiment, the flange portion has an opening at a first side. The coil structure passes through the opening and is electrically connected to the terminal electrode on the outer surface.

In an embodiment, the coil component further includes a plate connected to the core member. The plate and the core member collectively construct a magnetic path. The plate is connected to a second side of the flange portion, wherein the second side is opposite to the first side.

In an embodiment, the winding core portion extends along an axial direction, and the flange portion has an outer surface perpendicular to the axial direction and a lateral surface orthogonal to the outer surface. The mounting surface is the lateral surface.

In an embodiment, the flange portion has an inner surface opposite to the outer surface and orthogonal to the lateral surface. The coil structure extends to the lateral surface along the inner surface and is electrically connect to the terminal electrode mounted onto the lateral surface.

In an embodiment, a dihedral angle between the mounting surface and the propping surface is smaller than 180 degrees.

In an embodiment, the terminal electrode includes a flat connection piece to be connected to a circuit board, and the flat connection piece is mounted onto a bottom surface of the flange portion. The bottom surface is away from the plate.

In an embodiment, the supporting portion has an auxiliary soldering surface opposite to the propping surface. The auxiliary soldering surface is covered with a solder flux. The soldering member is attached to the solder flux to cover the auxiliary soldering surface.

In an embodiment, the solder flux and the soldering member include tin component.

In an embodiment, the terminal electrode includes a main body. The main body includes a first region covered with a solder flux and a second region not covered with the solder flux. The first region is adjacent to the second region. The supporting portion is connected to the second region. The second region is located between the supporting portion and the first region.

In an embodiment, the soldering member covers the supporting portion, and a portion of the soldering member is located at the second region.

In an embodiment, a hole is formed within a bent part of the clamping portion for placing the second portion of the coil structure. The second portion of the coil structure includes the insulating layer.

In an embodiment, the second portion of the coil structure is connected to the third portion of the coil structure, and the third portion of the coil structure is connected to the first portion of the coil structure.

In an embodiment, the terminal electrode includes a main body. The main body includes a first region covered with a solder flux, a second region not covered with the solder flux and a third region covered with the solder flux. The second region separates the first region from the third region. The clamping portion and the supporting portion are connected to the first region. The soldering member is connected to the protruding part and located at the first region.

In an embodiment, the solder flux and the soldering member include a similar material.

In conclusion, the present disclosure provides a coil component with an improved structure advantageous to the soldering procedure. According to the present disclosure, lower soldering energy is required, but stronger joint strength can be achieved. The coil structure and the terminal electrode can be soldered together much more easily. Therefore, damage resulting from high soldering energy is avoided without increasing the product cost and the production time.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
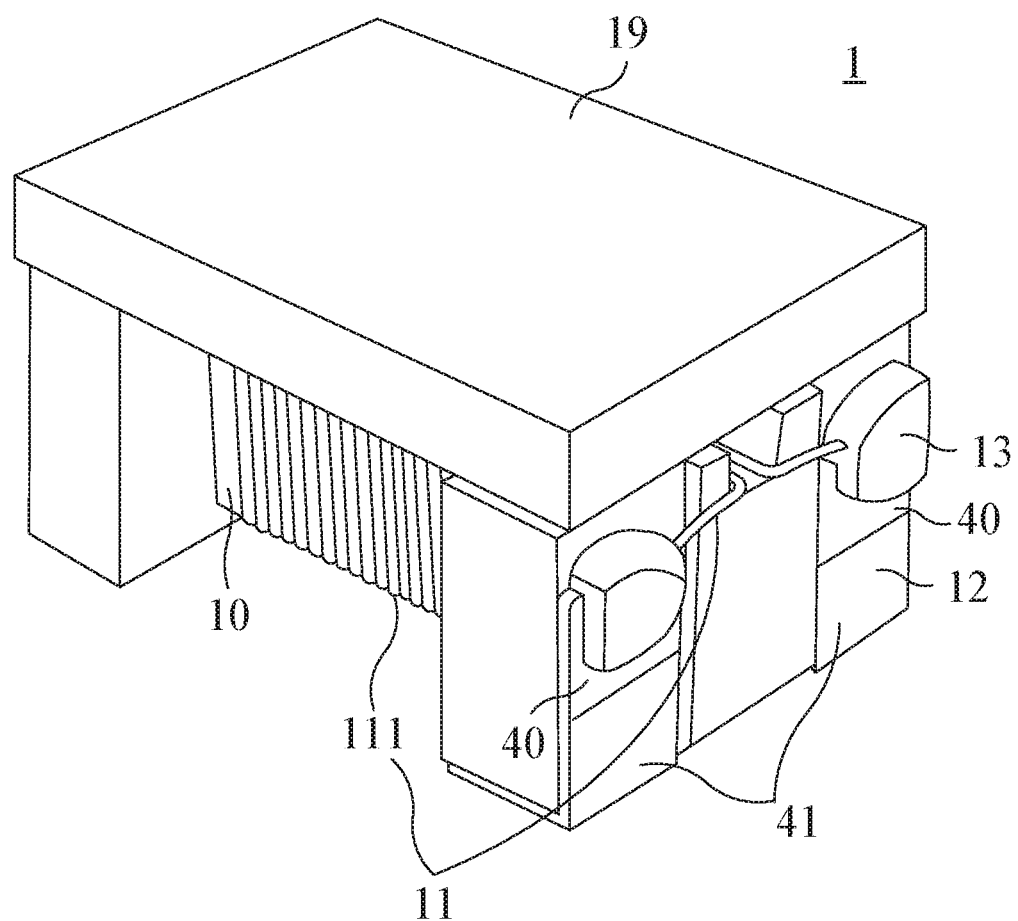
FIGS. 1A, 1B and 1C are perspective views illustrating a coil component according to an embodiment of the present disclosure.
Figure 1B:
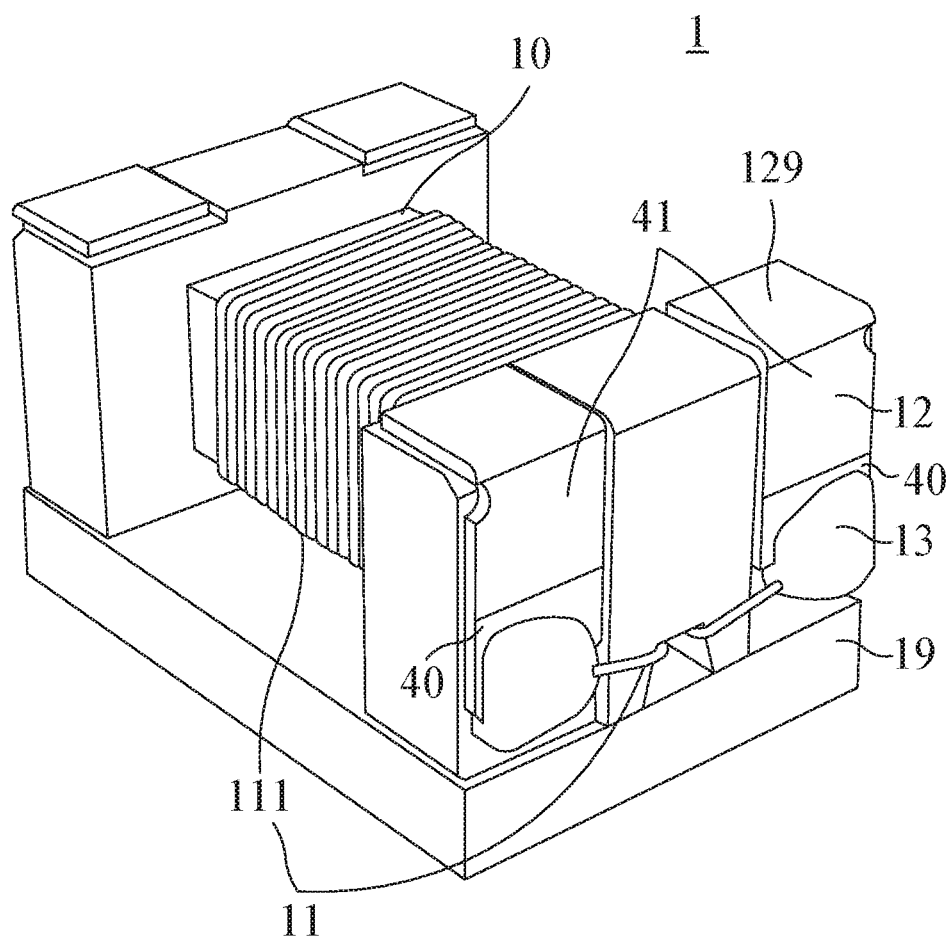
Figure 1C:
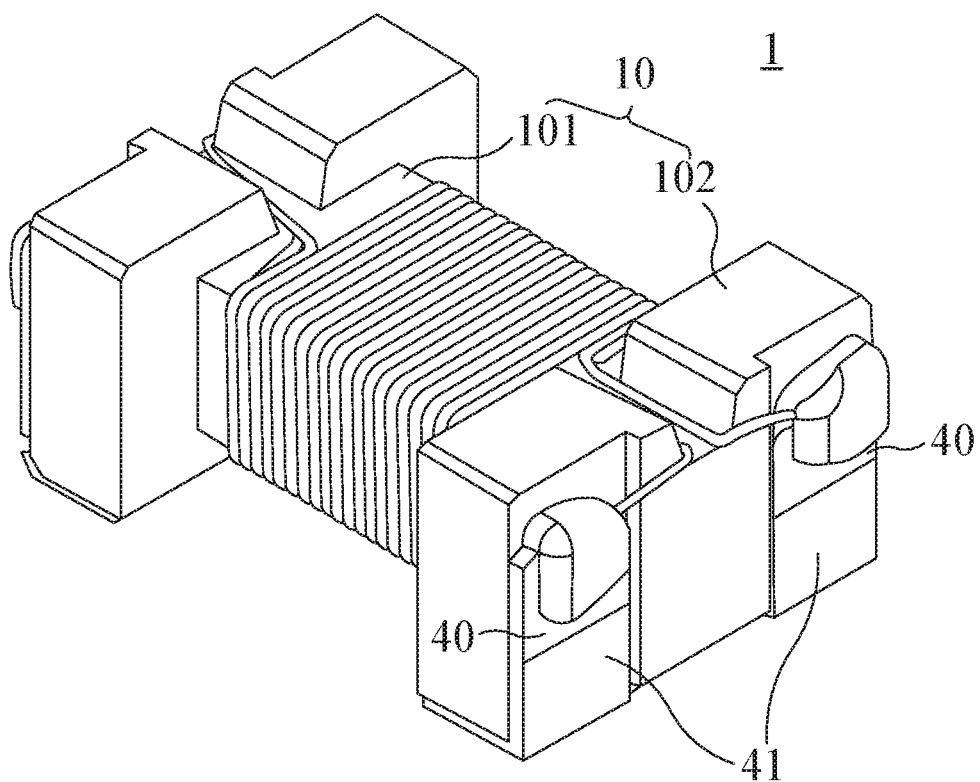

Please refer to FIGS. 1A, 1B and 1C, which are perspective views illustrating a coil component according to an embodiment of the present disclosure. The coil component 1 mainly includes a core member 10, a coil structure 11, at least one terminal electrode 12 and at least one soldering member 13. For example, the core member 10 is a drum core. As shown in FIG. 1A, a plate 19 is connected to and mounted onto the core member 10, so that combination of the plate 19 and the core member 10 constructs a closed magnetic path. The coil structure 11 includes a conductive wire covered by an insulating coating or an insulating protective layer, and a first portion 111 of the coil structure 11 is wound around the core member 10. The terminal electrode 12 is fixed to and mounted onto the core member 10. In this embodiment, the terminal electrode 12 is provided as a lead frame. The soldering member 13 fixes a third portion 113 (covered by the soldering member 13 and not shown in this diagram) of the coil structure 11 to the terminal electrode 12 to form electrical connection between the coil structure 11 and the terminal electrode 12.

In FIG. 1B, the coil component 1 is turned upside down to show the bottom of the coil component 1. Four lead frames (terminal electrodes 12) are mounted onto the outer surfaces of the core member 10. Each terminal electrode 12 may further include a flat connection piece 129 to be connected to a circuit board (not sown). The flat connection piece 129 is mounted onto a bottom surface of the flange portion 102. The plate 19 and the flat connect piece 129 are mounted onto opposite surfaces of the flange portion 102. In FIG. 1C, the plate 19 of the coil component 1 is hidden to show the coil structure 11 under the plate 19. The core member 10 is made of a magnetically permeable material (e.g. a material with high magnetic permeability), and the core member 10 includes a winding core portion 101 and two flange portions 102. The coil structure 11 is wound around the winding core portion 101 and extends to the outer surfaces of the flange portions 102 where the terminal electrodes 12 are mounted.

Figure 2A:
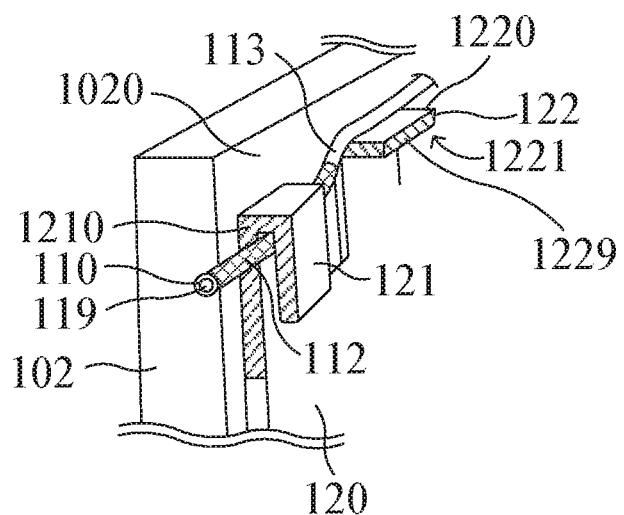
FIGS. 2A and 2B are partial views particularly showing the terminal electrode of the coil component of FIGS. 1A, 1B and 1C.
Figure 2B:
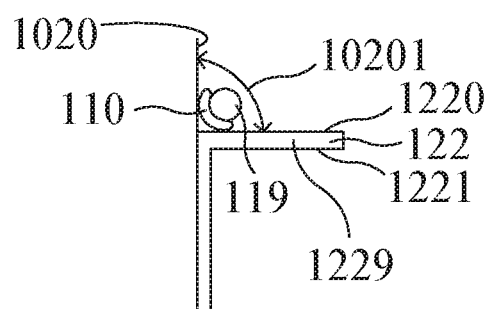

Please refer to FIGS. 2A and 2B showing the details of the terminal electrode 12. To clearly show the structure of the terminal electrode 12, the soldering member 13 (shown in FIGS. 1A~1C) covering the terminal electrode 12 is removed. The terminal electrode 12 mainly includes a clamping portion 121 and a supporting portion 122. The clamping portion 121 includes a bent part 1210 which clamps and fixes a second portion 112 of the coil structure 11. The supporting portion 122 includes a protruding part 1229 extending away from the flange portion 102 of the core member 10. The protruding part 1229 can restrict the flowing of the molten solder (e.g. tin) during the soldering procedure so that the molten solder is likely to accumulate around the protruding part 1229. Hence, the soldering member 13 may be spontaneously and properly formed near the protruding part 1229 without deviating from the desired position. Furthermore, stronger joint strength may be obtained because the protruding part 1229 is locked into the soldering member 13. It is to be noted that no matter whether the protruding part 1229 is in contact with the coil structure 11 or not, the effect of confining the molten solder and locking the soldering member 13 is still achieved.

The protruding part 1229 has a propping surface 1220. In an embodiment, the propping surface 1220 of the protruding part 1229 supports a third portion 113 of the coil structure 11, which is laid on and in contact with the propping surface 1220. The propping surface 1220 confines the third portion 113 of the coil structure 11 in a restricted space so that the third portion 113 of the coil structure 11 to be covered by the soldering member 13 is not free to move before and during the soldering procedure. Such design assists in the soldering procedure without further pressing the end of the coil structure 11. The overall area covered by the soldering member 13 is increased so as to raise the joint strength. The second portion 112 of the coil structure 11 is connected to the third portion 113 of the coil structure 11, and the third portion 113 of the coil structure 11 is connected to the first portion 111 of the coil structure 11. The coil structure 11 except a portion of the third portion 113 includes the insulating coating or the insulating protective layer 110. In other words, the conductive wire 119 of the third portion 113 of the coil structure 11 is partially or entirely bared and uncovered, while the conductive wire 119 of the first portion 111 and the second portion of the coil structure 11 is covered with the insulating coating/protective layer 110.

The terminal electrode 12 further includes a main body 120. The main body 120 is mounted onto a mounting surface 1020 of the flange portion 102. An intersection space is formed between the mounting surface 1020 and the propping surface 1220 for placing the third portion 113 of the coil structure 11. The dihedral angle 10201 between the mounting surface 1020 and the propping surface 1220 may be a right angle, an acute angle or an obtuse angle. The supporting portion 122 of the terminal electrode 12 has an auxiliary soldering surface 1221 opposite to the propping surface 1220. The auxiliary soldering surface 1221 is coated with a solder flux (not shown). The solder flux may be a chemical cleaning agent, a flowing agent, a purifying agent or a reducing agent for specific condition. The soldering member 13 is easy to be attached to the solder flux and tends to cover the auxiliary soldering surface 1221. In particular, if the dihedral angle 10201 is an acute angle, the mounting surface 1020 and the propping surface 1220 can effectively clamp and fix the third portion 113 of the coil structure 11. If the dihedral angle 10201 is an obtuse angle, the solder flux on the auxiliary soldering surface 1221 is favorable to attract and catch the molten solder to be attached to the auxiliary soldering surface 1221 so as to ensure position of the soldering member 13. If the dihedral angle 10201 is a right angle, as shown in FIG. 2B, the design concerns both issues.

Figure 3:
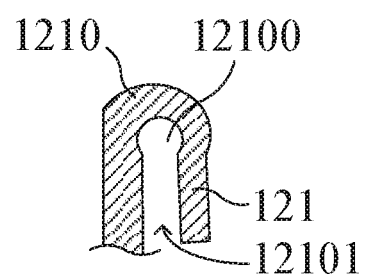
FIG. 3 is a sectional view of a clamping portion of the coil component according to another embodiment of the present invention.

Please refer to FIG. 3, which is a sectional view showing the structure of another clamping portion 121. A hole 12100 for placing the second portion 112 of the coil structure 11 (not shown) is formed within the bent part 1210 of the clamping portion 121. In the sectional view, the width of the gap 12101 between the main body 120 and the clamping portion 121 is slightly smaller than the diameter of the hole 12100 so that the second portion 112 of the coil structure 11 is fixed after being inserted and fit into the hole 12100.

Please refer to FIGS. 4A~4D, which are side views illustrating a manufacturing method of the coil component according to an embodiment of the present disclosure. The main body 120 of the terminal electrode 12 includes a first region 41 covered with a solder flux 1200 and a second region 40 not covered with the solder flux. For example, the solder flux on the second region 40 is stripped off before the soldering procedure. The first region 41 is adjacent to the second region 40. The supporting portion 122 is connected to the second region 40 without the solder flux. The second region 40 is located between the supporting portion 122 and the first region 41 with the solder flux 1200. The solder flux 1200 and the soldering member 13 may include tin component. The soldering member 13 entirely covers the supporting portion 122, and at least a portion of the soldering member 13 is located at the second region 40.

Figure 4A:
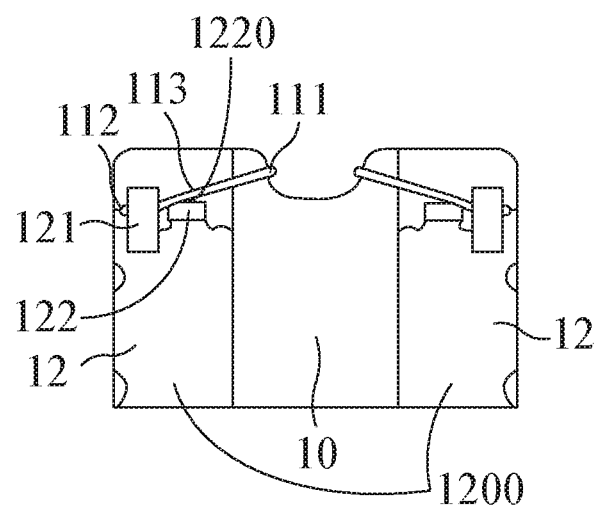
FIGS. 4A, 4B, 4C and 4D are side views illustrating a manufacturing method of the coil component according to an embodiment of the present disclosure.

The manufacturing method shown in FIGS. 4A~4D is described herein. In FIG. 4A, a core member 10, a coil structure 11 and at least a terminal electrode 12 (two terminal electrodes 12 are shown in this diagram) are provided. Each terminal electrode 12 includes the clamping portion 121 and the supporting portion 122. The first portion 111 of the coil structure 11 (including the insulating coating/protective layer) is wound around the core member 10. The second portion 112 of the coil structure 11 is inserted into the bent part 1210 of the clamping portion 121 so that the second portion 112 of the coil structure 11 is clamped and fixed by the clamping portion 121. The supporting portion 122 has the propping surface 1220 for supporting the third portion 113 of the coil structure 11.

Figure 4B:
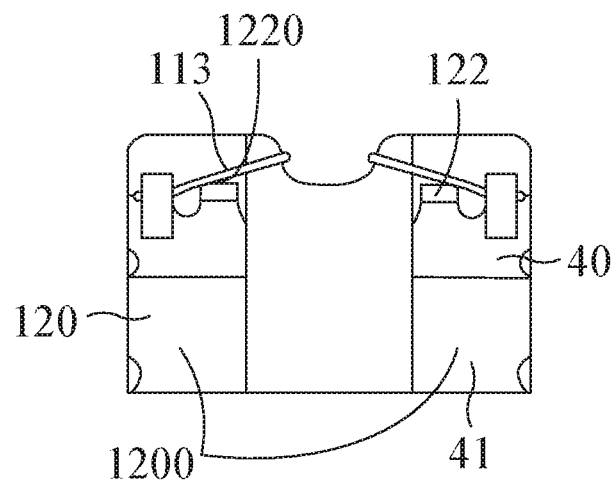

In FIG. 4B, a laser stripping procedure is performed to remove at least a portion of the insulating coating/protective layer of the third portion 113 of the coil structure 11 to reveal a portion of the conductive wire 119. The position of the revealed portion is the position where the laser emits the energy or radiation. At this time, the solder flux 1200 on the second region 40 of the main body 120 of the terminal electrode 12 is also removed during the laser stripping procedure. The solder flux 1200 on the first region 41 is remained because the laser light is not emitted to this region. The first region 41 is adjacent to the second region 40. The supporting portion 122 is connected to the second region 40. The second region 40 is located between the supporting portion 122 and the first region 41.

Figure 4C:
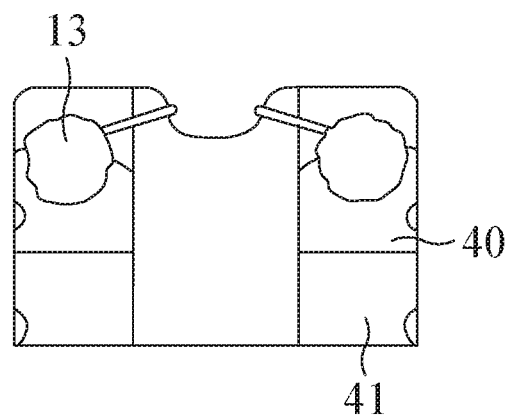

In FIG. 4C, the soldering procedure is performed to form the soldering member 13 covering the clamping portion 121, the supporting portion 122, and the second portion 112 and the third portion 113 of the coil structure 11. The soldering member 13 connects the supporting portion 122 to the conductive wire 119 in the coil structure 11 to create electrical connection between the coil structure 11 and the terminal electrode 12. A portion of the soldering member 13 is attached to the second region 40. In other words, the soldering member 13 may partially cover the second region 40. The soldering member 13 may be formed from solder paste. The soldering procedure may be a laser soldering procedure or a reflow soldering procedure to melt the solder paste. By melting the solder paste instead of the lead frame, the energy required for the soldering procedure is significantly reduced. Therefore, the energy is not as high as that used in the prior arts, and the damage to the elements of the coil component due to high soldering energy is avoided effectively.

Figure 4D:
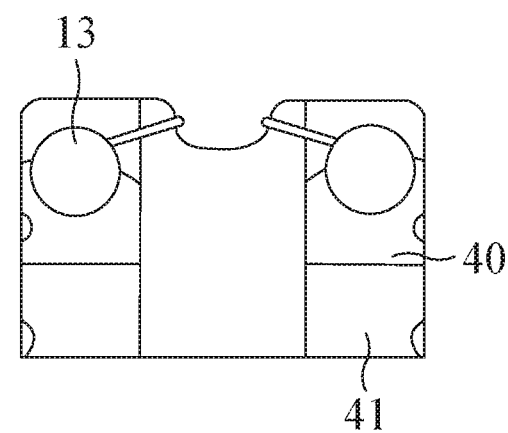

After heating, the solder paste has a smooth profile and finally forms a knob, as shown in FIG. 4D. The solder flux 1200 and the soldering member 13 include tin component. The soldering member 13 covers the supporting portion 122, and thus a portion of the soldering member 13 is located at the second region 40.

Please refer to FIG. 2A and FIG. 2B again. The supporting portion 122 has the propping surface 1220 and the auxiliary soldering surface 1221 opposite to each other. The auxiliary soldering surface 1221 is not emitted by the laser light so that the solder flux on the auxiliary soldering surface 1221 is not removed in the laser stripping procedure. Since similar material (e.g. tin) is included in both the solder flux and the soldering member 13, the soldering member 13 is easy to be attached to the auxiliary soldering surface 1221 with the solder flux so that the position where the soldering member 13 should be formed is roughly determined. According to the present application, only the energy sufficient to heat and melt the solder paste to form the soldering member 13 in the knob form and strip the undesired solder flux is required in the manufacturing method. The emitting direction of the laser may be substantially perpendicular to the surface of the main body 120 without frequently changing the emitting direction. Therefore, the manufacturing method of the coil component 1 is much easier.

Figure 5A:
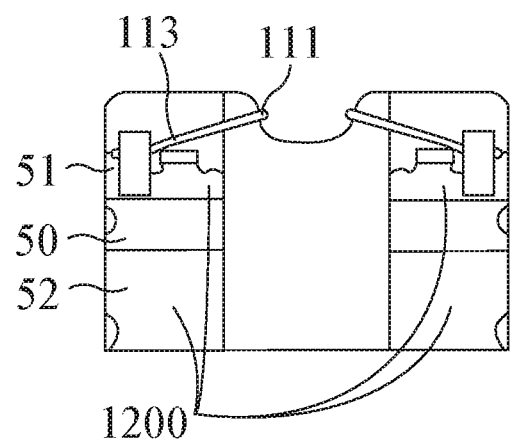
FIGS. 5A and 5B are side views illustrating a manufacturing method of the coil component according to another embodiment of the present disclosure.
Figure 5B:
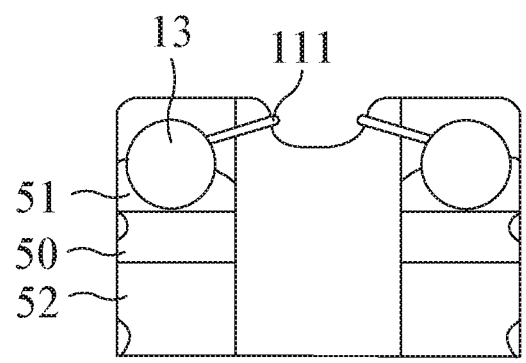

Please refer to FIG. 5A and FIG. 5B, which are side views illustrating a manufacturing method of the coil component according to another embodiment of the present disclosure. The manufacturing method is similar to that described with reference to FIGS. 4A~4D except that the main body 120 of the terminal electrode 12 includes a first region 51, a second region 50 and a third region 52. The laser stripping procedure is preformed to remove a portion of the insulating coating/protective layer of the third portion 113 of the coil structure 11 to reveal the conductive wire 119. The position of the revealed portion is determined by the emitted position. At this time, the solder flux on the second region 50 of the main body 120 of the terminal electrode 12 is also removed during the laser stripping procedure. The solder flux 1200 on the first region 51 and the third region 52 is remained because the laser light is not emitted to these regions. The second region 50 separates the first region 51 from the third region 52. In other words, the second region 50 is adjacent to the first region 51 and the third region 52 (FIG. 5A). Since similar material (e.g. tin) is included in both the solder flux 1200 and the soldering member 13, the soldering member 13 prefers to flatten out along the solder flux 1200 on the first region 51. Therefore, thinner soldering member 13 is obtained, and the coil component 1 with smaller size can be made.

Figure 6:
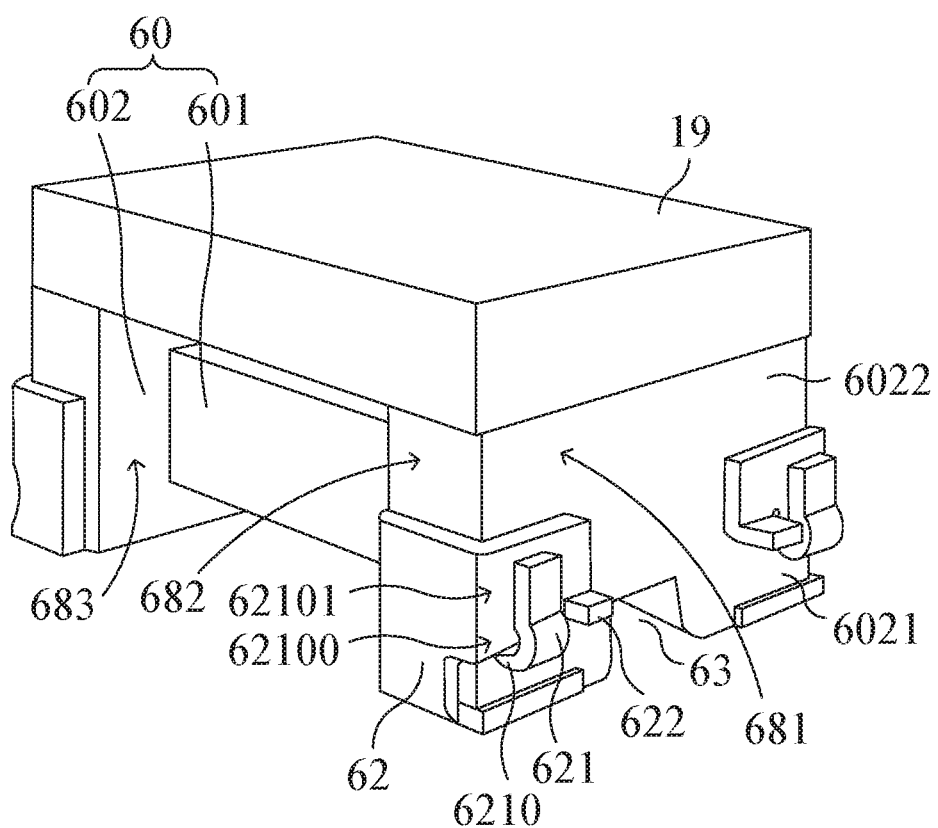
FIG. 6 is a perspective view illustrating a coil component according to a further embodiment of the present disclosure.

Please refer to FIG. 6, which is a perspective view illustrating a coil component according to a further embodiment of the present disclosure. Compared with the above embodiments, the relative position of the plate 19 and the structure of the lead frame (terminal electrode 62) are modified. As shown in FIG. 6, the terminal electrode 62 and the plate 19 are disposed at a first side 6021 and a second side 6022 of the flange portion 602, respectively. The hole 62100 for placing a portion of the coil structure (not shown in this diagram) penetrates through the bent part 6210 of the clamping portion 621. The hole 62100 is connected to the gap 62101 between the main body and the clamping portion 621. The bent direction of the clamping portion 621 is toward the second side 6022 of the flange portion 602. In other words, the hole 62100 is closer to the first side 6021 of the flange portion 602 than the gap 62101 is. The supporting portion 622 can support a portion of the coil structure, and the coil structure extends to the winding core portion 601 through an opening 63 at the first side 6021 of the flange portion 602. It is defined that the winding core portion 601 extends along an axial direction. The flange portion 602 has an outer surface 681 perpendicular to the axial direction, an inner surface 683 opposite to the outer surface 681, and a lateral surface 682 which is located between the outer surface 681 and the inner surface 683, and is orthogonal to the outer surface 681 and the inner surface 683. The mounting surface 1020 mentioned in the above embodiment is the outer surface 681. The coil structure is wound around the winding core member 601, extending to the outer surface 681 through the opening 63 on the flange portion 602, and electrically connected to the terminal electrode 62 mounted onto the outer surface 681. The plate 19 is connected to the core member 60, and the combination of the plate 19 and the core member 60 (i.e. the winding core portion 601 and two flange portions 602) constructs a closed magnetic path. The plate 19 is connected to the second side 6022 of the flange portions 602 wherein the second side 6022 is away from the opening 63. Thus, according to such design about the clamping portion 621 and the supporting portion 622, the coil structure passes through the opening 63 at the first side 6021 to be wound around the winding core portion 601 and connected to the terminal electrode 62. The flange portion 602 is of great structural integrity at the second side 6022 near the plate 19 because the opening 63 is located at the first side 6021 rather than the second side 6022. Thus, the contact surface between the flange portion 602 and the plate 19 is greater to construct the magnetic path in better efficiency. The coil component can provide higher magnetic flux and inductance.

Figure 7:
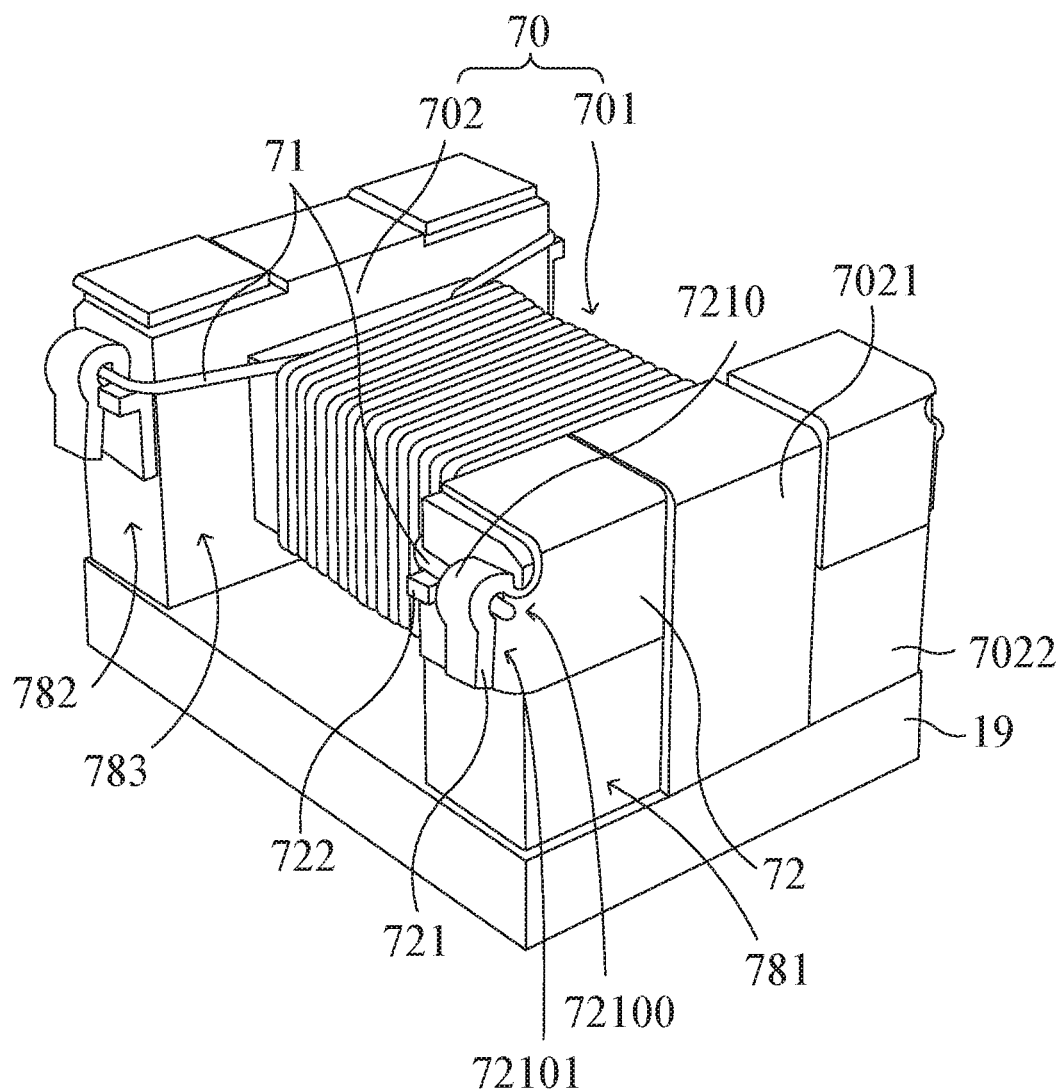
FIG. 7 is a perspective view illustrating a coil component according to a further embodiment of the present disclosure.

Please refer to FIG. 7, which is a perspective view illustrating a coil component according to a further embodiment of the present disclosure. In particular, the lead frame (terminal electrode 72) is modified. As shown in FIG. 7, the hole 72100 for placing a portion of the coil structure 71 is within the bent part 7210 of the clamping portion 721. The hole 72100 is connected to the gap 72101 between the main body of the terminal electrode 72 and the clamping portion 721. The bent direction of the clamping portion 721 is toward the second side 7022 of the flange portion 702. In other words, the hole 72100 is closer to the first side 7021 of the flange portion 702 than the gap 72101 is. The supporting portion 722 can support a portion of the coil structure 71, and the coil structure 71 extends to the winding core portion 701 along the lateral surface 782 and the inner surface 783 near the first side 7021 of the flange portion 702 of the core member 70. The opening 63 in FIG. 6 is not required, and the structural strength of the flange portion 702 of the core member 70 is enhanced. It is defined that the winding core portion 701 extends along an axial direction. The flange portion 702 has the outer surface 781 perpendicular to the axial direction, the inner surface 783 opposite to the outer surface 781, and the lateral surface 782 which is located between the outer surface 781 and the inner surface 783, and is orthogonal to the outer surface 781 and the inner surface 783. The mounting surface 1020 mentioned in the above embodiments is the lateral surface 782. The coil structure 71 is wound around the winding core member 701, extending to the lateral surface 782 along the inner surface 783, and electrically connected to the terminal electrode 72 mounted onto the lateral surface 782. Similarly, the flange portion 702 is of great structural integrity at the second side 7022 near the plate 19, and the contact surface between the flange portion 702 and the plate 19 is greater to construct the magnetic path in better efficiency. The coil component can provide higher magnetic flux and inductance, and better structural strength is achieved.

In conclusion, the coil component and the related manufacturing method can significantly reduce the required laser peak energy which may cause damage to the elements of the coil component. Such influence due to high peak energy is avoided without expensive machine or complicated process. Therefore, lower product cost and shorter production time are achieved.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A coil component comprising:
 a core member;
 a coil structure including an insulating layer, a first portion of the coil structure being wound around the core member;
 at least one terminal electrode mounted onto the core member and comprising a clamping portion and a supporting portion, wherein the clamping portion comprises a bent part for clamping a second portion of the coil structure, and the supporting portion comprises a protruding part, a conductive wire of a third portion of the coil structure being revealed; and
 a soldering member covering the protruding part to connect the supporting portion to the conductive wire to form electrical connection between the coil structure and the terminal electrode.

2. The coil component according to claim 1, wherein the protruding part has a propping surface in contact with the third portion of the coil structure, and the propping surface confines the third portion of the coil structure in a space.

3. The coil component according to claim 2, wherein the core member is made of a magnetically permeable material, the core member comprising a winding core portion and at least one flange portion, the terminal electrode being mounted onto the flange portion.

4. The coil component according to claim 3, wherein the terminal electrode comprises a main body mounted onto a mounting surface of the flange portion, the supporting portion being connected to the main body, an intersection space being formed between the mounting surface and the propping surface for supporting the third portion of the coil structure.

5. The coil component according to claim 4, wherein the winding core portion extends along an axial direction, and the flange portion has an outer surface perpendicular to the axial direction and a lateral surface orthogonal to the outer surface, the mounting surface being the outer surface.

6. The coil component according to claim 5, wherein the flange portion has an opening at a first side, the coil structure passing through the opening and being electrically connected to the terminal electrode on the outer surface.

7. The coil component according to claim 6, further comprising a plate connected to the core member, the plate and the core member collectively constructing a magnetic path, the plate being connected to a second side of the flange portion, the second side being opposite to the first side.

8. The coil component according to claim 4, wherein the winding core portion extends along an axial direction, and the flange portion has an outer surface perpendicular to the axial direction and a lateral surface orthogonal to the outer surface, the mounting surface being the lateral surface.

9. The coil component according to claim 8, wherein the flange portion has an inner surface opposite to the outer surface and orthogonal to the lateral surface, the coil structure extending to the lateral surface along the inner surface and being electrically connect to the terminal electrode mounted onto the lateral surface.

10. The coil component according to claim 4, wherein a dihedral angle between the mounting surface and the propping surface is smaller than 180 degrees.

11. The coil component according to claim 3, further comprising a plate connected to the core member, the plate and the core member collectively constructing a magnetic path.

12. The coil component according to claim 11, wherein the terminal electrode comprises a flat connection piece to be connected to a circuit board, and the flat connection piece is mounted onto a bottom surface of the flange portion, the bottom surface being away from the plate.

13. The coil component according to claim 2, wherein the supporting portion has an auxiliary soldering surface opposite to the propping surface, the auxiliary soldering surface being covered with a solder flux, the soldering member being attached to the solder flux to cover the auxiliary soldering surface.

14. The coil component according to claim 13, wherein the solder flux and the soldering member include tin component.

15. The coil component according to claim 1, wherein the terminal electrode comprises a main body, the main body comprising a first region covered with a solder flux and a second region not covered with the solder flux, the first region being adjacent to the second region, the supporting portion being connected to the second region, the second region being located between the supporting portion and the first region.

16. The coil component according to claim 15, wherein the soldering member covers the supporting portion, and a portion of the soldering member is located at the second region.

17. The coil component according to claim 1, wherein a hole is formed within a bent part of the clamping portion for placing the second portion of the coil structure, the second portion of the coil structure including the insulating layer.

18. The coil component according to claim 1, wherein the second portion of the coil structure is connected to the third portion of the coil structure, and the third portion of the coil structure is connected to the first portion of the coil structure.

19. The coil component according to claim 1, wherein the terminal electrode comprises a main body, the main body comprising a first region covered with a solder flux, a second region not covered with the solder flux and a third region covered with the solder flux, the second region separating the first region from the third region, the clamping portion and the supporting portion being connected to the first region, the soldering member being connected to the protruding part and located at the first region.

20. The coil component according to claim 19, wherein the solder flux and the soldering member include a similar material.

* * * * *